Dec. 1, 1964

P. F. MAGYAR 3,159,258

MECHANICAL LOADING DEVICE

Filed Dec. 28, 1962

INVENTOR.
PETER F. MAGYAR

BY

*John B. Sowell*

ATTORNEY

Dec. 1, 1964   P. F. MAGYAR   3,159,258
MECHANICAL LOADING DEVICE
Filed Dec. 28, 1962   2 Sheets-Sheet 2

INVENTOR.
PETER F. MAGYAR
BY
John B. Sowell
ATTORNEY

United States Patent Office 3,159,258
Patented Dec. 1, 1964

3,159,258
MECHANICAL LOADING DEVICE
Peter F. Magyar, Warren, Mich., assignor to The Budd Company, Philadelphia, Pa., a corporation of Pennsylvania
Filed Dec. 28, 1962, Ser. No. 248,003
9 Claims. (Cl. 193—32)

This invention relates to a mechanical loading device actuated by the parts being loaded and more particularly to a self-adjusting feed chute for mechanical loaders.

Parts being loaded into bins or containers are usually fed onto conveyor belts and dropped into the container or bin. This practice may not be employed when parts are first machined to very accurate tolerances from soft steel prior to hardening or heat treating. If the part has threads on the exterior surface a drop of several inches is sufficient to form dents or burrs that are hardened along with the part to produce inoperable parts.

It has been the former practice to hand load parts or to employ hand operated batch loaders when soft parts are handled prior to hardening. Such practice has not proven completely satisfactory.

It is a primary object of the present invention to provide an automatic parts loader.

It is a further object of the present invention to provide an automatic loader with a self-adjusting conveyor.

It is another object of the present invention to provide an automatic loader with a counterbalanced conveyor tray having a pivotal end dispenser.

It is another object of the present invention to provide a conveyor adjustable for height and slope which will convey parts by gravity down the conveyor and deposit them on top of a random height pile without dropping them any appreciable distance.

It is a general object of the present invention to provide a device for loading fragile parts in a pallet box without harming the parts.

Loaders constructed in accordance with the invention may in general provide a pivotal connection on a base for supporting a conveyor, a conveyor guide frame connected to said pivotal connection having channel guides for rollers attached to the conveyor, stop slots in said guide frame, a stop lever on said conveyor, adapted to engage said stop slots, a pivotal dispenser mounted at the lower end of the conveyor, a control actuation rod connected to said stop lever actuated by pivotal movement of said pivotal dispenser to disengage said stop lever from said stop slot permitting said conveyor to be moved by said rollers in said guide frame, and means for moving said conveyor from one stop slot to another when said stop lever disengages a stop slot.

Other features and objects of the invention will be found throughout the more detailed description of the invention which follows. To more clearly portray the invention and its manner of operation the description is supplemented with the accompanying drawings wherein.

Figure 2:
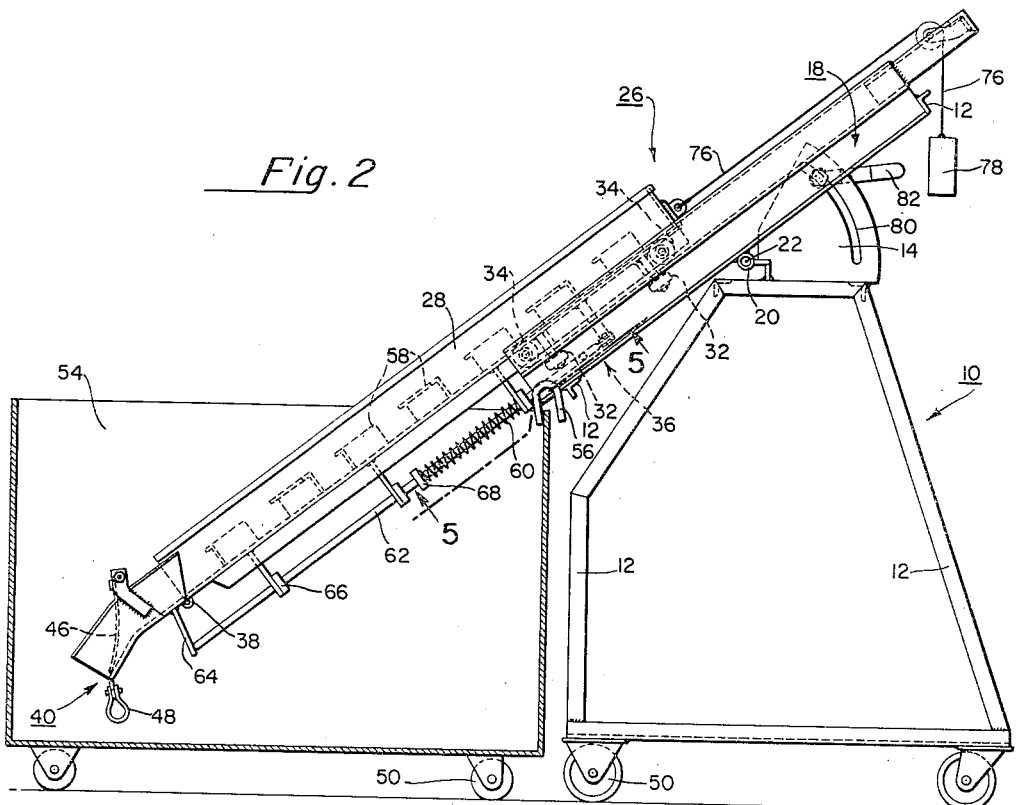
FIG. 2 is a side elevation of the mechanical loading device positioned for loading on a pallet box.
Figure 1:
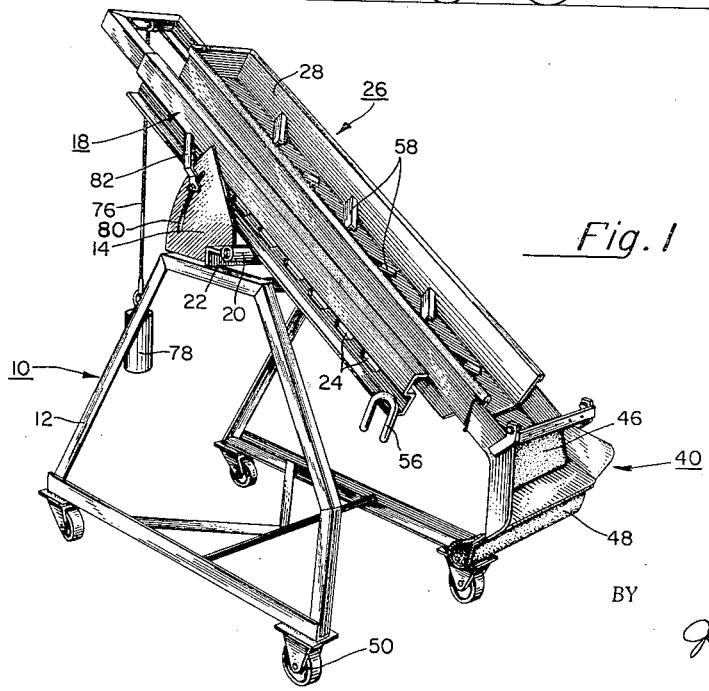
FIG. 1 is a perspective drawing of the mechanical loading device.

Referring now to FIGS. 1 and 2 showing four distinct and severable subassemblies of the mechanical loading device. Base assembly 10 is preferably fabricated from structural shapes such as angles 12 and provided with a sector plate 14 and a pivot bushing 16. Guide frame assembly 18 is preferably fabricated from opposite disposed channels interconected by angles similar to angles 12 and provided with a pivot bushing 20 adapted to interfit with pivot bushing 16 for pivotal attachment to base assembly 10 by pivot pin 22. Stop slots 24 are formed in the lower portion of one side of the guide frame assembly 18. Conveyor assembly 26 comprises a conveyor tray 28 reinforced with angle braces 30 and provided with lateral and longitudinal guide rollers 32 and 34 attached to the angle braces 30. In order to prevent relative movement of the guide frame assembly 18 to the conveyor assembly 26 a stop lever 36 is rigidly affixed to the conveyor tray 28 and is cooperable with the stop slot or stop means 24 on the guide frame assembly 18. A pivot bushing 38 is provided on the lower inclined end of the conveyor tray 28 for attachment of the dispensing assembly 40 provided with a mating pivot bushing 42 for interconnection by pivot pin 44. Dispensing assembly 40 forms a diverging continuation of the conveyor tray 28 and is provided with a flexible guard 46 which closes off the dispensing assembly 40 to create a hopper at the end of the conveyor tray. On the lower inclined end of the dispensing assembly a flexible end piece 48 is provided to enable pivotal action of the hopper as will be explained hereinafter. In order to employ the mechanical loader in its intended environment the base assembly is provided with rollers 50. The loader is manually placed in the close proximity of a machine which is producing fragile parts such as threaded bolts 52 which must be placed rather than dropped in a pallet box. Bolts 52 are carried from the producing machine by a chute or conveyor belt (not shown) and introduced into the inclined conveyor tray 28 which has been extended downward in its inclined guide frame into a pallet box 54 as shown in FIG. 2. The conveyor tray extends across the pallet box and the end guard 48 is located sufficiently high above the bottom to enable pivoting action of the hopper of the dispensing assembly 40. Relative position of box and frame is maintained by U-shaped keepers 56. Parts are easily introduced into the open conveyor tray 28 one by one as they are made. The tray may be lined with a cushioning material but this has not been found necessary for screw machine parts which are to be heat treated. Baffles 58 affixed to the bottom of the tray cause the part to trace a zigzag path which ends as the part is introduced to the dispensing device 40. The parts arrive at flexible guard 46 with insufficient force to flex the guard and pass out of the hopper thus accumulating parts in the hopper. The accumulation of parts slowly pivots dispensing assembly 40 against the holding force of spring means 60 acting through actuating rod 62 on actuating plate 64 attached to the dispenser 40.

Figure 5:
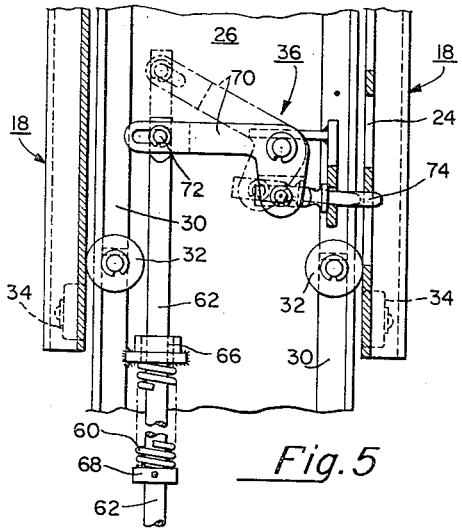
FIG. 5 is a bottom view in section taken at lines 5—5 of FIG. 2 showing the rollers and stop means.
Figure 3:
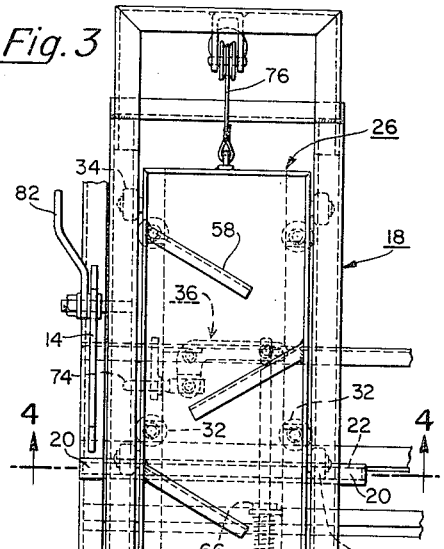
FIG. 3 is a plan view of the conveyor and guide frame.
Figure 4:
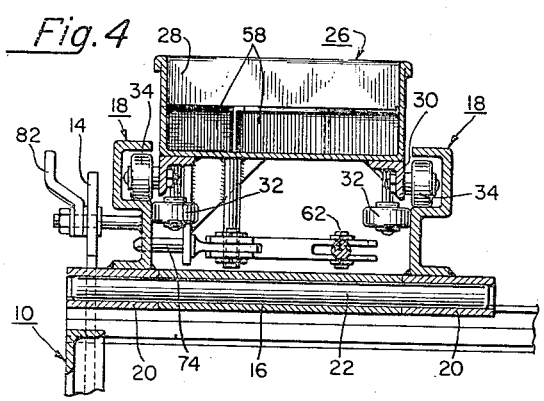
FIG. 4 is a section in elevation taken at lines 4—4 of FIG. 3 showing the rollers and stop means.
Figure 6:
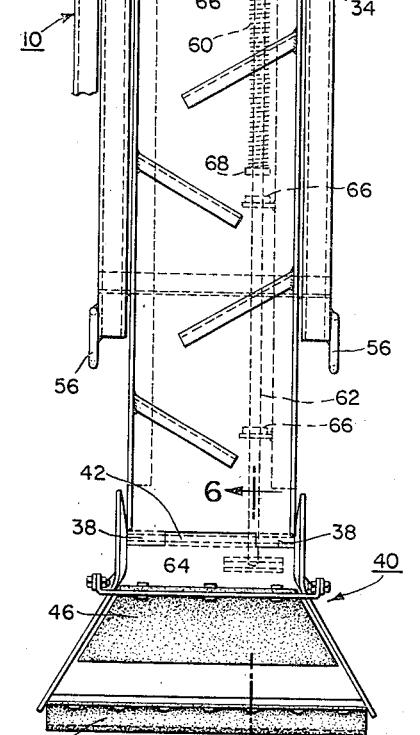
FIG. 6 is a section in elevation taken at lines 6—6 of FIG. 3 showing the pivotal dispenser.

As shown in FIGS. 3 to 6 pivoting of the hopper compresses spring 60 between guide collar 66 and adjustable stop collar 68 moving stop lever 70 upward and rearward, is shown in FIG. 5 by dotted lines. Stop lever 70 is provided with a loose link connection 72 for cooperation with actuation rod 62 and a stop pin 74 pivoted on the other end of bell crank stop lever 70. Enough parts accumulate in the hopper to disengage stop pin 74 from stop slots 24 permitting cable 76 and weight 78 to pull the conveyor tray rearward. Rapid movement of the conveyor tray combined with the tilted position of the hopper is sufficient force to bend flexible guard 46 permitting these parts to be placed and spread on the bottom of the pallet box. Once the parts are deposited or unloaded spring 60 forces the hopper back to its normal loading position and simultaneously re-engages stop pin 74 with stop means 24. Weight 78 acting as a simplified retraction means need only be sufficient to retract the loaded conveyor when the dispensing device disengages the stop means by pivotal engagement with the actuation means. It has been observed that there is some friction between stop pin 74 and stop means 24 and as this friction is slowly overcome in the inception, the latter motion of the hopper is a quick snap action particularly enhancing the desired operation of the unloading and permitting clearance of stop pin 74 and stop means 24 as the conveyor quickly moves by snap action to the next position.

It was found that a broad range of different size parts could be handled by the loader without any necessary modification for a given weight of steel parts occupies almost identical space. However, elongated and odd shaped parts tend to pile up at the end of the dispenser in odd shaped piles. Flexible end piece permits the hopper to be pivoted into a pile of odd shaped parts where a solid end piece would lock up and prevent actuation. Stop collar 68 may be moved on actuation rod 62 to determine the weight of parts required to disengage the stop means and simultaneously retract the conveyor tray.

A preferred setting of the spring is to have it tight enough to accumulate sufficient parts before unloading the hopper to cause the parts to pile up in the pallet box without spreading parts across the bottom. In actual practice a standard size steel pallet box can be filled to the top with small bolts or similar parts simply by placing the conveyor tray completely across the box to a point near the bottom and maintaining an incline of 30 to 45 degrees. A steep incline retracts the tray less distances across the box than a gradual incline and there is provided a sector plate 14 on base 10 which has an annular slot 80 therein. A sector lock pin located on the guide frame 18 is fitted through the slot and threaded on its end to engage a sector lock lever 82 to permit adjustment of the conveyor incline.

The preferred embodiment shown is both welded and bolted together in a manner familiar to those skilled in the art. While a single specific embodiment has been shown to illustrate the novel cooperation of the basic element the invention is not limited to the particular structural details as many equivalents will suggest themselves to those skilled in the art now that the novel combination is explained. It is accordingly desired that the appended claims be given a broad interpretation commensurate with the scope of the invention in the art.

What is claimed is:

1. A gravity actuated mechanical loading device for parts comprising, an inclined conveyor tray for transferring parts by gravity, guide means on said conveyor tray, a guide frame for cooperation with said guide means, stop means on said guide frame providing a plurality of positions thereon, a stop lever attached to said conveyor tray to prevent relative movement of said conveyor tray to said guide frame when engaging with said stop means, a dispenser device mounted at the lower end of said conveyor tray, conveyor retraction means urging said inclined conveyor tray upward in said guide frame, and an actuation device cooperating between said dispenser device and said stop lever to disengage said stop lever from said stop means to permit said conveyor tray to be moved by said conveyor retraction means to a new position determined by re-engagement of said stop lever with said stop means.

2. In a loading device according to claim 1 wherein said actuation device includes an actuation rod connected to said stop lever, and spring means acting on said rod to urge engagement of said stop lever with said stop means.

3. In a loading device according to claim 2 wherein said dispenser device comprises a pivotal hopper mounted on the lower end of said conveyor tray, and an actuating plate connected to said pivotal hopper for engagement with said actuation rod whereby said spring means further urges said pivotal hopper to a loading position.

4. In a loading device according to claim 3 which further includes a flexible guard mounted across the end of said pivotal hopper for retaining parts moving by gravity down said inclined conveyor until the weight of the accumulated parts on said hopper becomes sufficient to overcome said spring means holding the hopper in the loading position causing pivoting of said hopper to an unloading position and simultaneously operation of said actuation device.

5. In a loading device according to claim 4 which further includes a flexible end piece on the end of said pivotal hopper to permit said hopper extended pivotal movement when engaging solid objects causing said end piece to flex or move when engaging said solid objects.

6. In a loading device according to claim 1 which further includes a sector plate mounted on a base, a sector lock mounted on said guide frame, and a pivot connection between said guide frame and said base whereby said guide frame may be pivoted and locked in selective inclined positions.

7. In a loading device according to claim 6 which further includes U-shaped keepers mounted on said guide frame for engagement with the edge of a pallet box to maintain relative position of said loading device to said pallet box at said locked in selective inclined positions.

8. A mechanical loading device comprising in combination, a base support, an inclined guide frame pivoted on said base support, an inclined conveyor tray slidably mounted in said guide frame, a hopper pivotally mounted on the lower end of said conveyer tray, actuating means mounted on said conveyor tray cooperating with said hopper and with said guide frame restraining movement of said hopper and of said conveyor tray, conveyor retraction means urging said conveyor tray to move up said inclined guide frame, said actuating means being activated by pivoting of said hopper to overcome the restraining force of said actuating means and permits upward movement of said conveyor tray by said conveyor retraction means.

9. A mechanical loading device according to claim 8 which further includes baffles in said conveyor tray closing off a portion of said passageway for decelerating the gravitational movement of parts down said inclined conveyor tray, and a flexible guard mounted across the end of said hopper to hold said parts on said hopper until said hopper is pivoted by the weight of accumulated parts where said parts in said hopper in the pivoted position exert sufficient force on said flexible guard to move past said guard and slide out of said hopper.

References Cited by the Examiner

UNITED STATES PATENTS

| | | | |
|---|---|---|---|
| 1,008,684 | 11/11 | White | 193—32 |
| 1,808,587 | 6/31 | Adams | 193—32 |
| 2,925,162 | 2/60 | Tuncq | 193—7 |

SAMUEL F. COLEMAN, *Acting Primary Examiner.*